United States Patent
Medlin, Jr.

(10) Patent No.: US 8,387,927 B1
(45) Date of Patent: Mar. 5, 2013

(54) CABLE POSITIONING BRACKET

(76) Inventor: Lewis B. Medlin, Jr., Vinton, VA (US)

( * ) Notice: Subject to any disclaimer, the term of this patent is extended or adjusted under 35 U.S.C. 154(b) by 0 days.

(21) Appl. No.: 12/931,536

(22) Filed: Feb. 3, 2011

Related U.S. Application Data

(63) Continuation-in-part of application No. 12/800,331, filed on May 13, 2010.

(51) Int. Cl.
*F16L 3/02* (2006.01)
*H02B 1/40* (2006.01)
*H02G 3/08* (2006.01)

(52) U.S. Cl. ..... 248/68.1; 248/56; 248/205.1; 52/220.7; 52/715; 174/481; 174/503

(58) Field of Classification Search ............... 248/56, 248/58, 65, 68.1, 67.7, 72, 205.1, 906; 174/50, 174/58, 61, 64, 480, 481, 502, 503; 52/220.7, 52/220.8, 715
See application file for complete search history.

(56) References Cited

U.S. PATENT DOCUMENTS

| | | | |
|---|---|---|---|
| 3,363,864 A * | 1/1968 | Olgreen | 248/68.1 |
| 5,448,011 A * | 9/1995 | Laughlin | 174/480 |
| 5,527,990 A * | 6/1996 | Comerci et al. | 174/502 |
| 6,996,943 B2 * | 2/2006 | Denier et al. | 52/220.7 |
| 7,053,300 B2 * | 5/2006 | Denier et al. | 174/58 |
| 7,667,137 B1 * | 2/2010 | Beckman | 174/58 |
| 7,866,611 B2 * | 1/2011 | Hollender et al. | 248/67.7 |

OTHER PUBLICATIONS

Caddy Product Information Sheet for Non-Metallic Sheathed Cable & MC/AC Cable Support CER4.

* cited by examiner

*Primary Examiner* — Tan Le
(74) *Attorney, Agent, or Firm* — Michael R. Philips

(57) ABSTRACT

A cable positioning bracket is provided for mounting to a building component, e.g. a wall stud. The bracket has an anchor plate for being connected to the broad surface of the building component and a pair of side plates for being connected to the narrow surface of the building component. A pair of platforms are positioned adjacent to a slot for supporting one or more cables. A series of opposed tabs are provided in several embodiments, the tabs oriented to engage and support one or more cables. One side plate pivots away from the building component by means of a hinge plate to insert the cable or cables. The tabs in one embodiment are formed with side strips surrounding a window, the strips allowing arcuate bending of the tabs to minimize fatigue failure.

6 Claims, 8 Drawing Sheets

CABLE POSITIONING BRACKET

RELATED APPLICATION

This application is a continuation-in-part of application Ser. No. 12/800,331 filed May 13, 2010.

FIELD OF THE INVENTION

The present invention relates to the field of wiring support devices for use in building construction, and more particularly to a bracket for positioning cables at a predetermined distance from a wall surface.

BACKGROUND OF THE INVENTION

In 1990, the National Electrical Code (NEC) was revised to require that electrical wires and cables mounted within a wall structure must be at least one-and-one-quarter (1.25) inches behind the inner wall surface. This code provision is intended to reduce the likelihood that a nail, or other sharp implement, would damage the insulation and potentially cause an electrical fire. The NEC further requires that a cable is secured at the 1.25 inch offset within 12 inches of an electrical box or other fitting, and at intervals of not more than 4.5 feet along a run.

A number of devices have been developed to implement the NEC requirement for a 1.25 inch offset, as described in the following patents:

U.S. Pat. No. 5,067,677 to Miceli is for a Wire Harness. This device is for mounting on the face of a wall stud to hold a number of wires spaced between the surfaces of a wall. The device has one arm for mounting to a stud and a second arm for attaching wires. A series of clips are placed along the second arm for receiving and holding wires.

U.S. Pat. No. 5,141,185 to Rumbold et al. is for a Wiring Clip. This patent discloses a clip having an L-shaped portion to be secured to a stud and a strut and hinged arm remote from the L-shaped portion, the arm is adapted for being folded back and locked around several wires.

U.S. Pat. No. 5,587,555 to Rinderer is for a Conductor Holding Device. This conductor holder has a support member having two perpendicular arms, one arm for being affixed to a stud and the other arm being formed with one or more holes. A clamp having a leg and a head is mounted with the leg through the one hole in the arm and the head holding the conductor at a fixed distance from a wall surface.

A commercial cable positioning bracket has been introduced by Erico International Corporation of Solon, Ohio under the brand name Caddy®. This bracket mounts to a building structural component, e.g. a stud, and uses a bendable tab to press a cable against a vertical plate. The Caddy® bracket is marked "Patent Pending."

SUMMARY OF THE INVENTION

A cable positioning bracket is configured for being mounted to a wall stud and for positioning a series of cables a selected distance from the inner surfaces of the wall. The bracket is formed with an anchor plate that is attached in parallel contact with the wall stud. A horizontal platform extends perpendicularly out from the anchor plate, and a side plate extends down from the platform. A portion of the side plate is attached to the stud. A second horizontal platform is connected to the first horizontal platform by a hinge member. A second side plate extends down from the second platform. A first series of tabs is formed along the first platform, and a second series of tabs is formed along the second platform with the first and second tabs facing toward one another. The tabs are positioned and sized to bend when engaging cables. The second platform and side plate are pivoted out by bending the hinge member to allow insertion of the cables in parallel to the stud. When the cables are in position, the second platform and side plate are pivoted back to enclose the cables, with the two sets of tabs engaging the cables. The second side plate is then attached to the stud to stabilize the bracket and hold the cables at a fixed distance from the wall surfaces. In a further embodiment, the cables are engaged by the platforms without bendable tabs. In another embodiment, tabs are provided with windows punched through to enable arcuate bending, rather than bending along a line.

BRIEF DESCRIPTION OF THE DRAWINGS

The present invention is best understood in conjunction with the accompanying drawing figures in which like elements are identified by similar reference numerals and wherein.

DETAILED DESCRIPTION OF THE PREFERRED EMBODIMENTS

Figure 1:
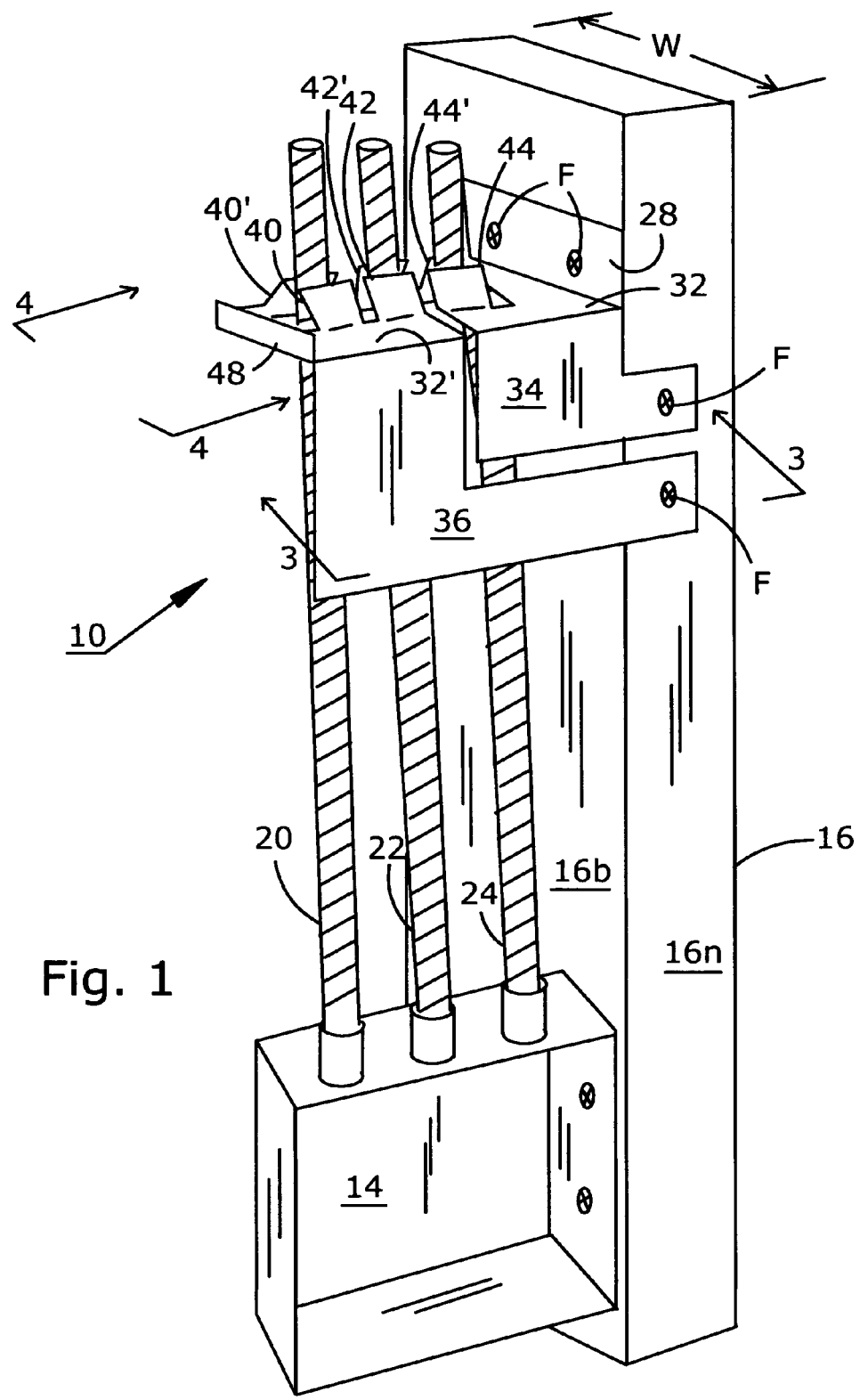
FIG. 1 is a perspective view of a cable positioning bracket according to a first embodiment of the invention mounted to a wall stud and holding a series of cables in a desired position, the cables connected at a lower end thereof to an electrical junction box.

Referring to FIG. 1, a cable positioning bracket 10 of the present invention is mounted to a wall stud 16. As illustrated, cable positioning bracket 10 is fully closed around a set of three cables. Wall stud 16 has a broad side 16b and a narrow side 16n. Wall stud 16 may be either a wood stud or a metal stud, as is known in the trade. A wall structure, e.g. gypsum board or drywall, will be mounted to the narrow side 16n of wall stud 16, with another wall structure mounted to the opposite narrow side of wall stud 16. An electrical junction box 14 is mounted to wall stud 16, illustrated a short distance below cable positioning bracket 10. However, as will be understood from the description to follow, cable positioning bracket 10 may be located anywhere along the run of a cable or cables as may be required by a Local Code or the NEC. A set of cables 20, 22 and 24, shown as, but not restricted to, metal sheathed cable, are connected to electrical junction box 14 at their respective ends and are held at a selected distance from the narrow side 16n as well as the opposite narrow side of wall stud 16. As discussed above, the distance from each wall structure must be at least 1.25 inches. The width W of the broad side 16b of a commonly used wall stud 16 is approximately 3.50 inches. Therefore, positioning cables 20, 22 and 24 at least 1.25 inches from each narrow side of wall stud 16 leaves a space of 1.0 inch for the cables to reside. While three cables 20, 22 and 24 are shown, different numbers of cables, e.g. 2 cables or 5 cables, may be used within the scope of the invention.

Referring further to FIG. 1, an anchor plate 28 of bracket 10 is attached to broad side 16b of wall stud 16 by fasteners F, e.g. screws appropriate to the material of wall stud 16. As illustrated, wall stud 16 is oriented vertically, although bracket 10 of the invention is adaptable to use on horizontal building members, i.e. joists. A horizontally oriented platform 32 extends outwardly from anchor plate 28, a portion of platform 32 passes behind cables 20, 22 and 24 and a portion thereof passes in front of cable 24. A vertically oriented side plate 34 extends downwardly from platform 32. A portion of side plate 34 overlaps a portion of narrow side 16n of wall stud 16 and is anchored thereto by a fastener F. A second platform 32' is located adjacent to platform 32 with an open gap between. Second platform 32' is connected to the portion of first platform 32 that resides behind cables 20, 22 and 24 by a hinge plate 48, extending upwardly from, and substantially perpendicular to, platforms 32 and 32'. While anchor plate 28 and hinge plate 48 are shown extending upwardly from platforms 32 and 32', it will be understood that downward orientation of either or both plates is considered to be within the scope of the present invention. A second side plate 36 extends downwardly from second platform 32', with a portion of second side plate 36 overlapping a portion of narrow side 16n of wall stud 16, and being fastened thereto with a fastener F. As illustrated, bracket 10 is securely mounted to wall stud 16 by anchor plate 28 mounted to broad side 16b and side plates 34 and 36 mounted to narrow side 16n to securely maintain the position and orientation of cables 20, 22 and 24.

Referring further to FIG. 1, a tab 44 is formed from platform 32. Three additional tabs 44', 42' and 40' are formed from the rear portion of platform 32 residing behind cables 20, 22 and 24. Two additional tabs 40 and 42 are formed from second platform 32'. When cables 20, 22 and 24 are passed between tabs 40 and 40', 42 and 42', 44 and 44', the tabs bend in the direction of movement of the cables, holding the cables securely in position. Whereas three cables of the same size and three pairs of tabs are shown in the example bracket, alternate numbers of cables and alternate numbers and various sizes of tabs may be utilized.

Figure 2:
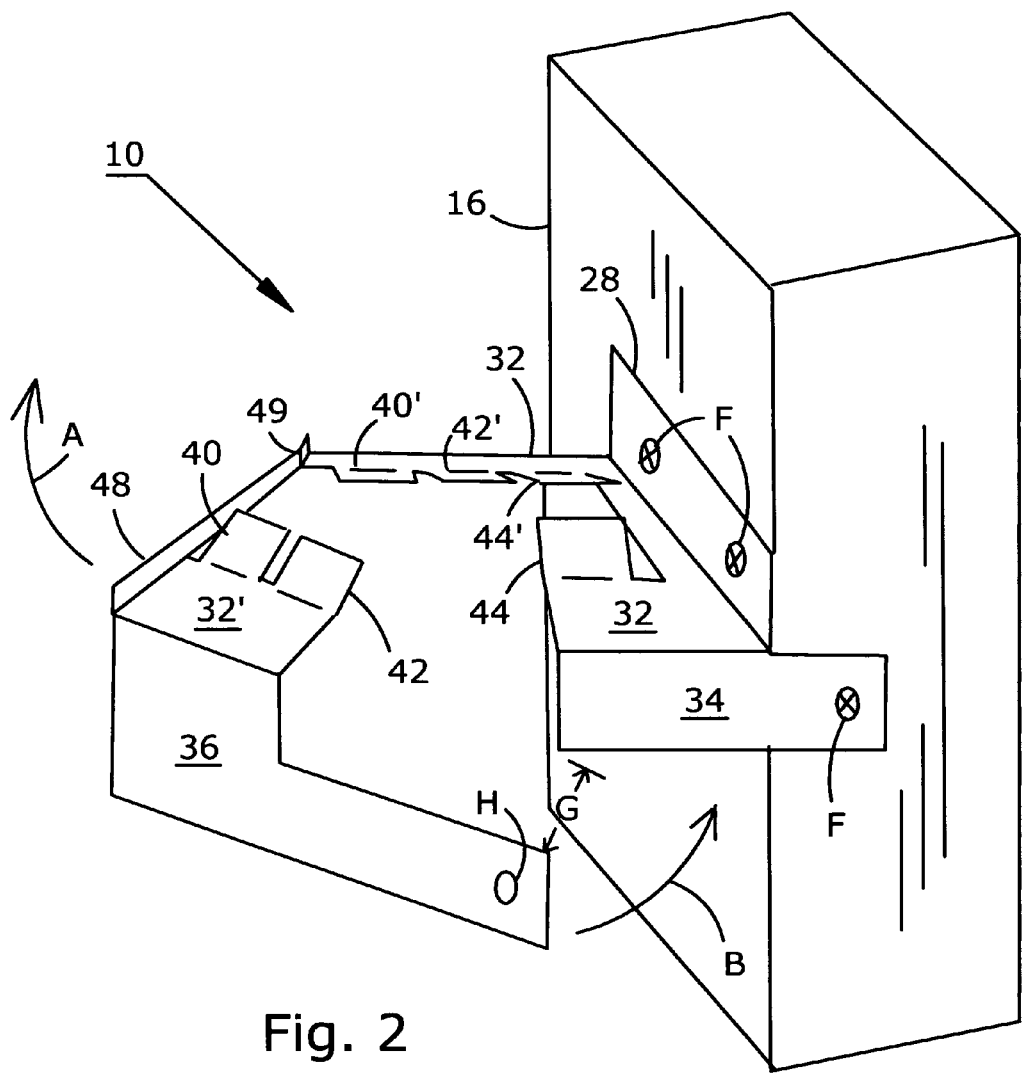
FIG. 2 is a cable positioning bracket of FIG. 1 mounted to a stud, the bracket in the open condition prior to inserting cables.

Referring now to FIG. 2, cable positioning bracket 10 is shown in the open condition as partially mounted to wall stud 16 prior to the insertion of cables. Anchor plate 28 and side plate 34 are mounted with fasteners F to wall stud 16. While attachment of side plate 34 to wall stud 16 provides a degree of stability to bracket 10, the invention recognizes that an alternate embodiment without side plate 34 would function similarly in practice. Platform 32 extends outwardly from anchor plate 28, with the forward portion of platform 32 connected to downwardly oriented side plate 34. The rear portion of platform 32 has tabs 40', 42' and 44' formed therein. Platform 32' has tabs 40 and 42 formed therein. Side plate 36 extends downwardly from platform 32', with an elongate outer section provided for attachment to wall stud 16. Hinge plate 48 connects the rear portion of platform 32 with platform 32'. Hinge plate 48 is vertically oriented (perpendicular to the plane of platforms 32, 32') to be controllably bendable in the direction indicated by arrow A when second platform 32' and second side plate 36 are moved away from wall stud 16. A gap G is created between side plate 34 and side plate 36. The bend 49 occurring in hinge plate 48 may be at various positions along the length thereof within the scope of the invention. Alternatively, hinge plate 48 may bend in an arc rather than at a sharp corner. A hole H is positioned near the end of side plate 36 to attach side plate 36 to wall stud 16 after inserting one or more cables through gap G to be placed between front tabs 40, 42, 44 and rear tabs 40', 42', 44'. Side plate 36 is closed in the direction indicated by arrow B to position hole H in side plate 36 below fastener F through side plate 34. When side plate 36 is attached to wall stud 16, as shown in FIG. 1, cable positioning bracket 10 rigidly and securely holds the cables at the required distance from the wall structure to be mounted to wall stud 16.

Figure 3:
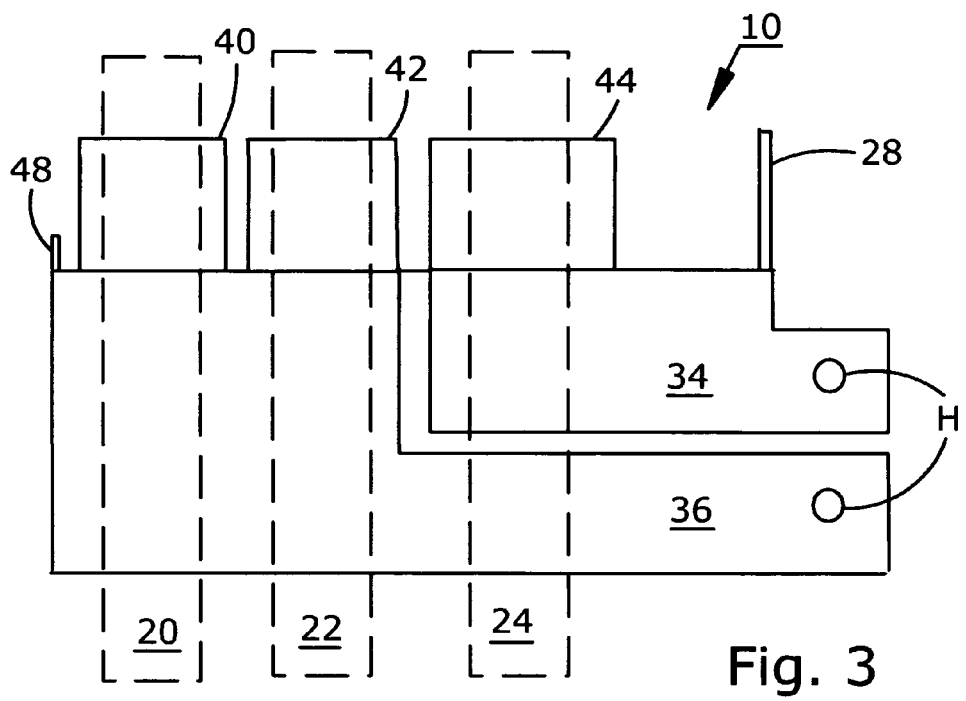
FIG. 3 is a side elevation view of the bracket of FIG. 1 taken in the direction indicated by line 3-3 of FIG. 1 with a series of cables held therein, the cables shown in dashed lines.
Figure 4:
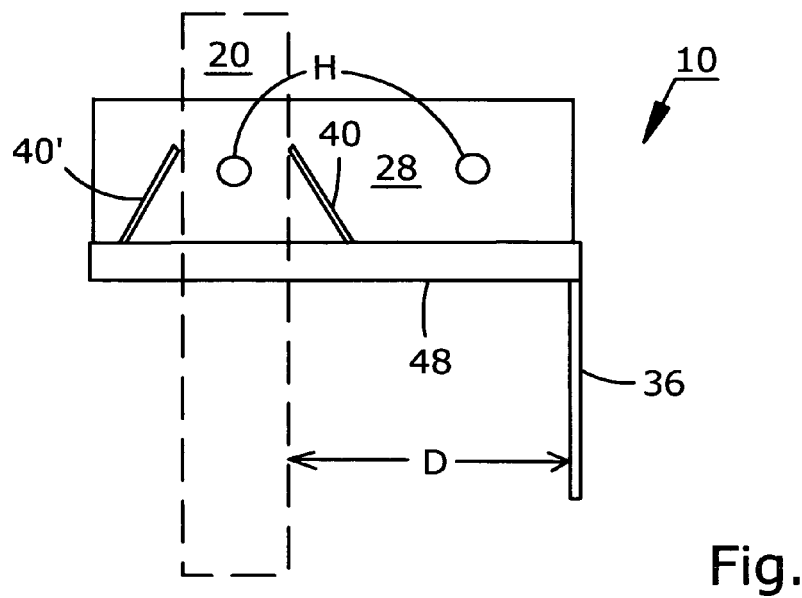
FIG. 4 is an end elevation view of the bracket of FIG. 1 taken in the direction indicated by line 4-4 of FIG. 1 with a series of cables held therein, the cables shown in dashed lines.

Referring now to FIGS. 3 and 4, cable positioning bracket 10 is shown in the closed condition in side elevation view and end elevation view, respectively. Cables 20, 22 and 24 are shown in dashed lines for clarity. Side plate 34 and side plate 36 are coplanar in preparation for being attached to a wall stud (not shown). Anchor plate 28 is substantially perpendicular to side plates 34 and 36. Hinge plate 48 is substantially perpendicular to side plates 34 and 36. Tabs 40, 42, 44, 40', 42' and 44' (see FIG. 2) are securely holding cables 20, 22 and 24 (see FIGS. 1 and 3) to ensure that distance D (see FIG. 4) is not less than 1.25 inches, as required by the NEC Standard described above.

Figure 5:
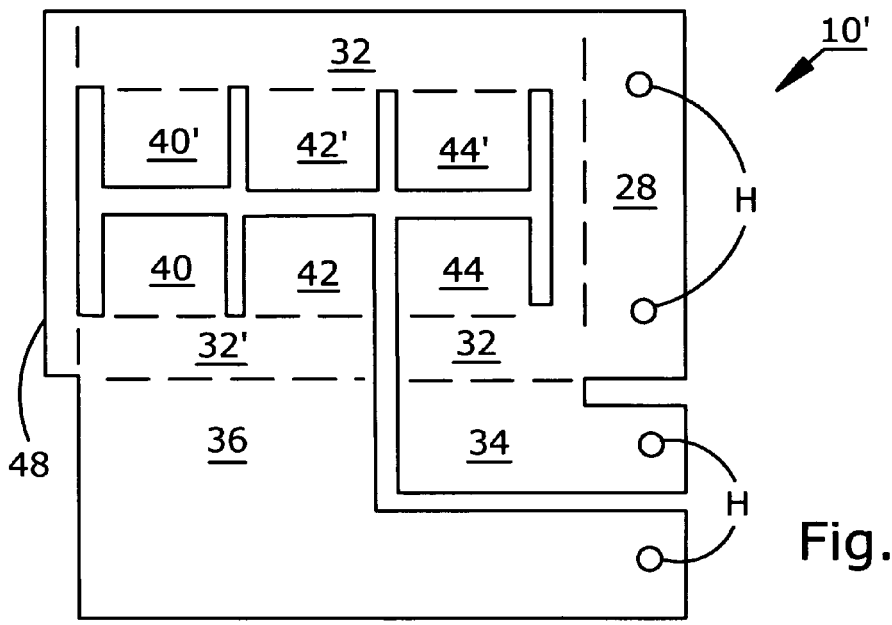
FIG. 5 is a top plan view of the bracket of FIG. 1 as punched from a planar sheet prior to being folded.

Referring now to FIG. 5, cable positioning bracket 10' is illustrated in planar form prior to being bent to the shape described above. The bracket of the invention is preferably formed of galvanized sheet metal approximately 0.025 inch thick, i.e. 24 gauge. It is to be understood that alternate materials and thickness are considered to be within the scope of the invention described. The initial formation of planar bracket 10' of sheet metal is preferably by punch press processing to create slots between tabs 40, 42, 44, 40', 42' and 44', as well as between side plates 34 and 36. In addition, holes H are formed for mounting to a wall stud. Subsequent to punching to form the slots and holes of the design, the dashed lines are bent, e.g. by a sheet metal brake, to obtain the three-dimensional shape illustrated in FIGS. 1-4.

Figure 6:
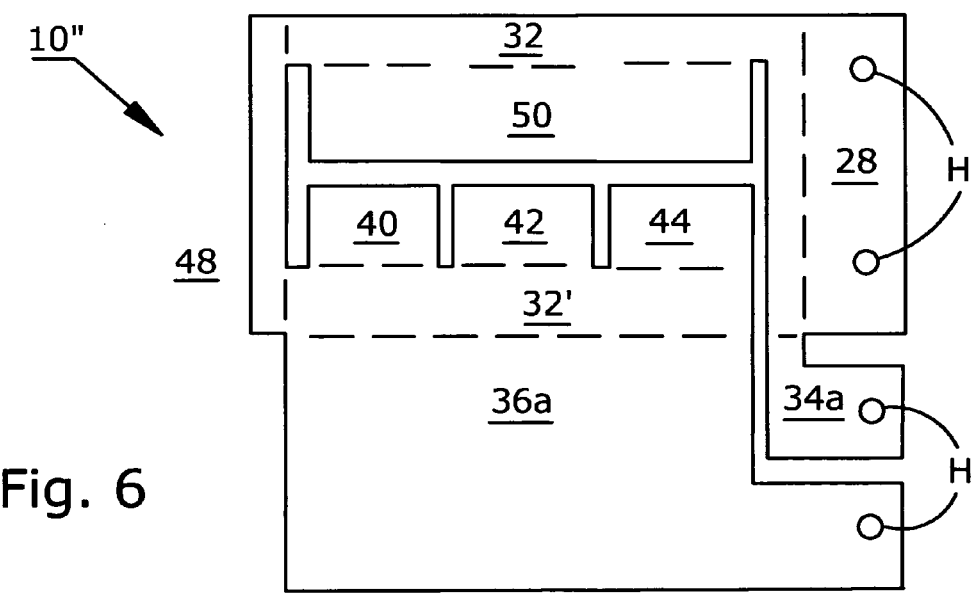
FIG. 6 is a top plan view of a bracket according to a second embodiment of the invention as punched from a planar sheet prior to being folded.

Referring now to FIG. 6, an alternate configuration is illustrated as cable positioning bracket 10", shown in planar form. This second embodiment of the invention has three tabs 40, 42 and 44 on one side of bracket 10" and a single, long, tab 50 on the opposite side thereof. In addition, all three tabs 40, 42 and 44 are formed from platform 32', as different from the previously disclosed embodiment of the invention. Tab 50 may be formed of different widths, therefore leaving the gap between tab 50 and tabs 40, 42 and 44 wider or narrower. Further, an elongate tab similar to tab 50 may be formed on both sides of bracket 10". Other aspects and manufacturing processes relating to this alternate embodiment of the invention are substantially similar to the designs described above.

Figure 7:
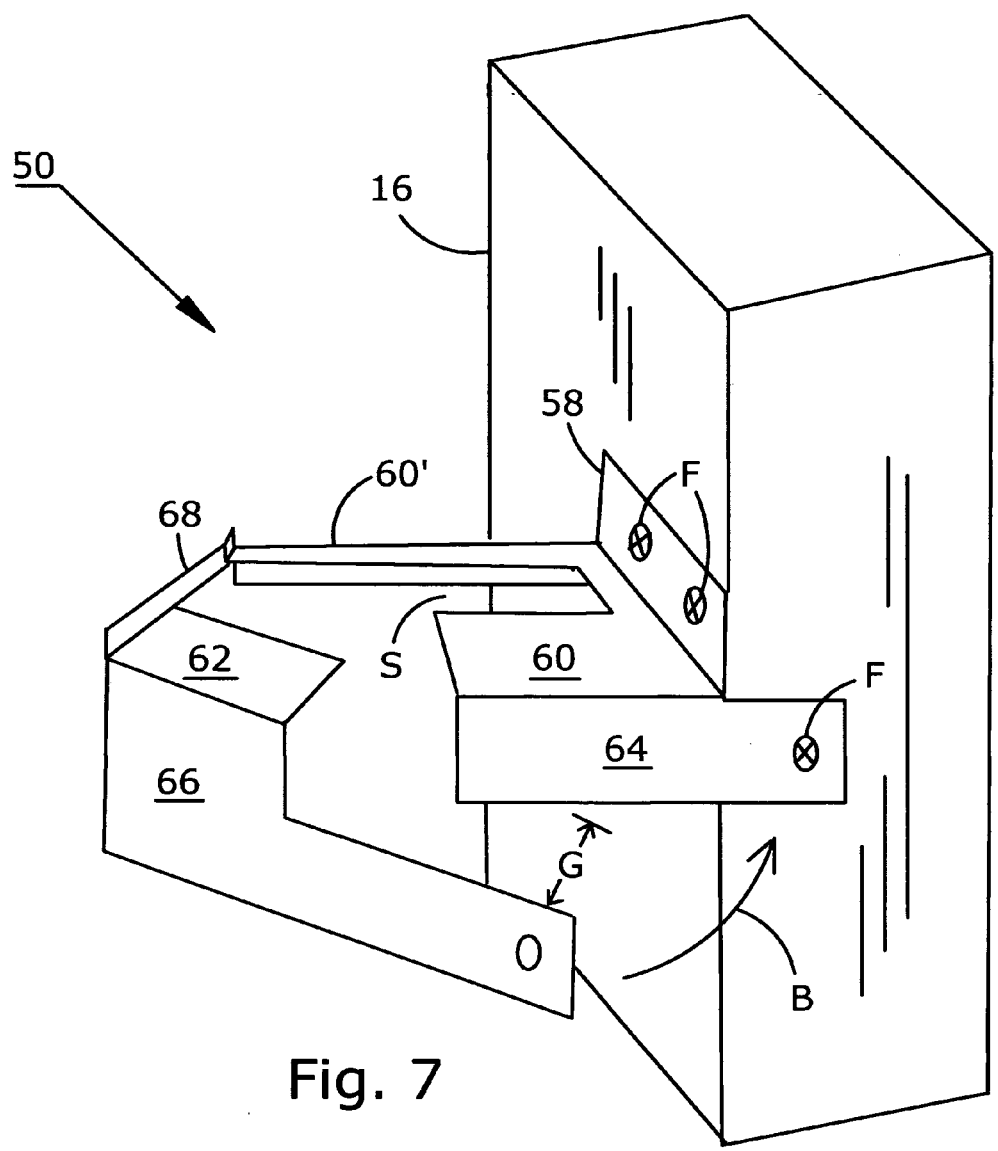
FIG. 7 is a perspective view of a cable positioning bracket according to a third embodiment of the invention, the bracket mounted to a wall stud and shown in the open condition prior to inserting cables.
Figure 8:
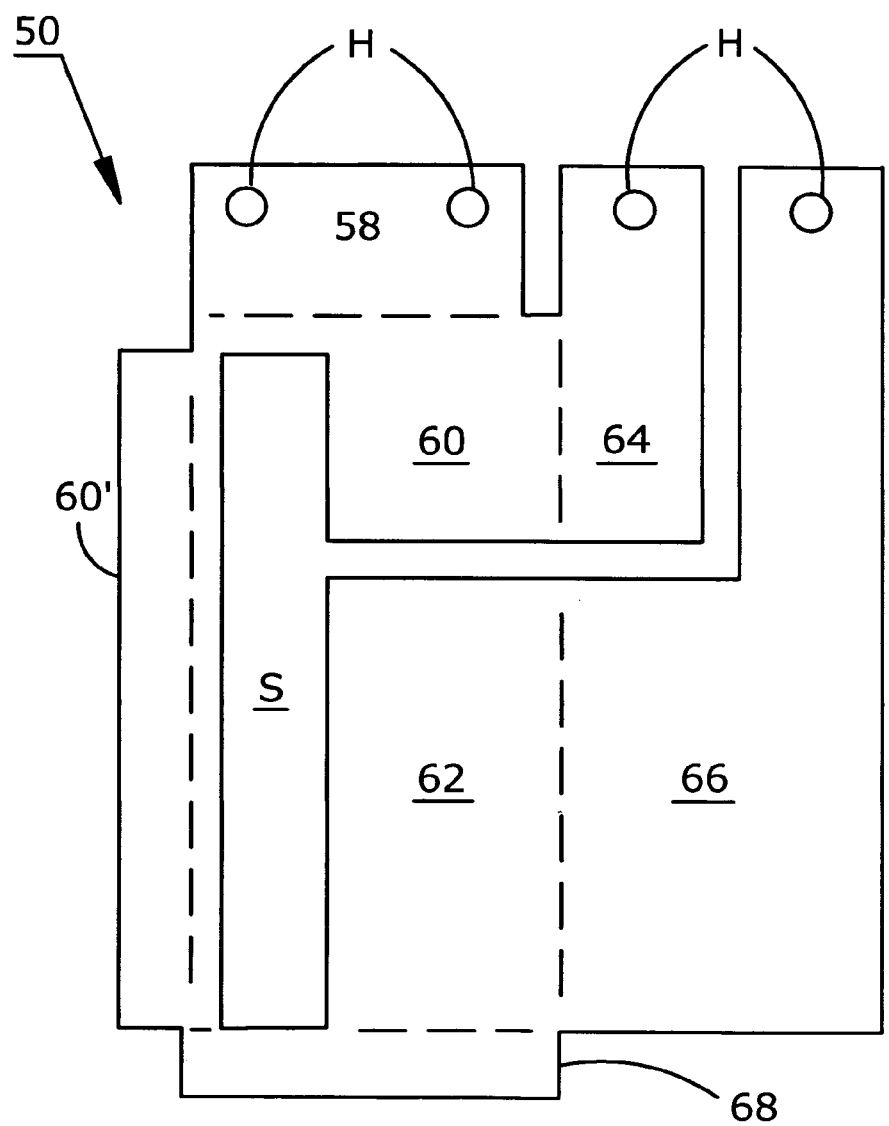
FIG. 8 is a top plan view of the bracket of FIG. 7 as punched from a planar sheet prior to being folded.

Referring now to FIGS. 7 and 8, a cable positioning bracket 50 of a third embodiment of the invention is illustrated in three dimensional bent form and in planar form as punched from sheet material, respectively. In the three dimensional form, bracket 50 is shown as mounted to a wall stud 16 in open condition prior to inserting cables. When in open condition, a gap G remains for insertion of cables. In the planar drawing of FIG. 8, dashed lines indicate folding locations to form the three dimensional functional bracket shape of FIG. 7. Bracket 50 has an anchor plate 58 for mounting to stud 16 by fasteners F. A horizontally oriented planar main platform 60 extends outwardly from anchor plate 58, with a rear portion 60' of main platform 60 ending a greater distance from anchor plate 58. A slot S of a size to receive and hold cables therein is located between plate 60 and rear portion plate 60'. A vertically oriented side plate 64 depends downward from main platform 60. Side plate 64 extends beyond the corner of stud 16 where an additional fastener F further affixes bracket 50 to stud 16. A hinge plate 68 is positioned at the distal end of rear portion plate 60' with a secondary horizontal platform 62 connected to hinge plate 68. A vertically oriented side plate 66 depends downward from secondary platform 62, side plate 66 being elongate to be affixed to stud 16 at a location below side plate 64. Main platform 60, rear portion plate 60' and secondary platform 62 are co-planar. When cables are inserted between platforms 60, 60' and 62, and side plate 66 is moved in the direction of arrow B and affixed to stud 16, a small gap remains between main platform 60 and secondary platform 62, securely holding cables in bracket 50. Slot proportions and gap proportions are indicated generally best in FIG. 8.

Figure 9:
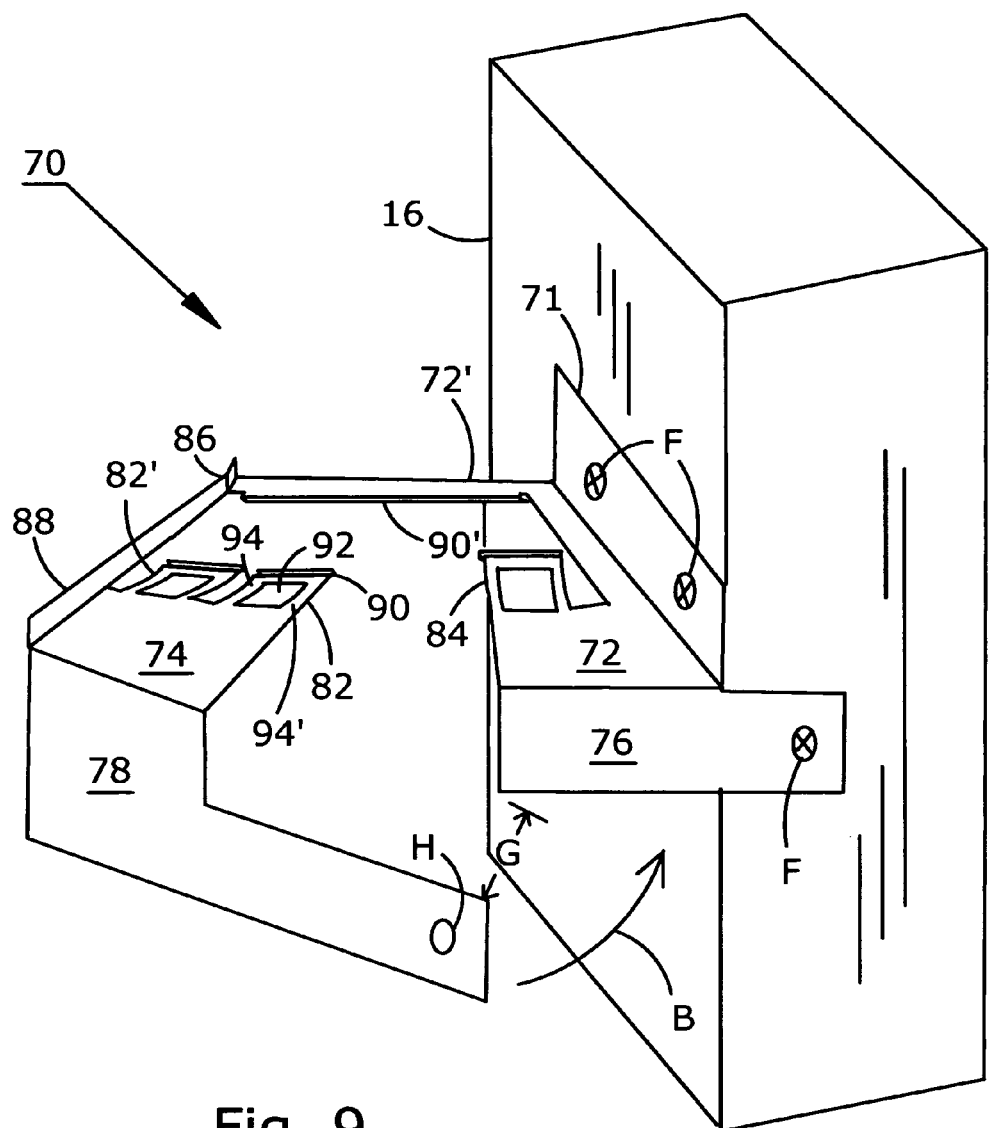
FIG. 9 is a perspective view of a cable positioning bracket according to a fourth embodiment of the invention, the bracket mounted to a wall stud and shown in the open condition prior to inserting cables.

Referring now to FIG. 9, a cable positioning bracket 70 according to a fourth embodiment of the invention is illustrated as it is mounted to a building component, e.g. wall stud 16. When in open condition, a gap G remains open for the insertion of cables. A vertically oriented anchor plate 71 is positioned against a side of wall stud 16 and affixed thereto with fasteners F. A horizontally oriented platform 72 and rear portion plate 72' extends outward from anchor plate 71. A vertically oriented side plate 76 extends downward from platform 72 and has an elongate configuration to be affixed to wall stud 16 with a fastener F. A hinge plate 88 is oriented substantially parallel to anchor plate 71, extending from the outer end of rear portion platform 72' to a second platform section 74. A vertically oriented side plate 78 extends down from platform 74 and is elongate to connect to wall stud 16 by inserting a fastener through hole H when bracket 70 is closed.

Referring further to FIG. 9, a pair of tabs 82 and 82' extend from platform 74 in the direction of rear portion platform 72', and a third tab 84 extends from platform 72 in the direction of rear portion platform 72'. When cable positioning bracket 70 is closed and side plate 78 is connected to wall stud 16, the space between tabs 82, 82', 84 and rear portion platform 72' is preferably equal to or slightly smaller than the thickness of a cable to be placed therein. Tab 82, as being a typical tab of bracket 70, is formed with a substantially rectangular open window 92 that is bordered by a first strip 94 and a second strip 94'. Strips 94, 94' are substantially rectangular and are equal in width to each other. The reduction in sheet material created by punching window 92 and leaving strips 94, 94' causes tab 82 to bend along a curve rather than in a straight line bend. As is known, a straight line bend concentrates strain in a small area and will result in a fatigue failure of the sheet after multiple bend cycles, whereas a curve bend distributes the strain and increases the useful bending life of the sheet.

Continuing in reference to FIG. 9, each tab 82, 82' and 84 is formed with an inverted ridge 90 at a distal edge thereof. Ridge 90 is formed in the shape of a "V" so as to direct the outermost edge of tabs 82, 82' and 84 upward and to reduce the possibility of abrasion of a cable being contacted thereby. An inverted ridge 90' is formed along the inner edge of rear portion platform 72' in substantially mirror image of inverted ridge 90 of tabs 82, 82' and 84. Alternate inverted ridge shapes to accomplish the purpose of minimizing cable surface abrasion while providing secure anchoring, e.g. a "U" shape or an "L" shape, are understood to be within the scope of the present invention.

Figure 10:
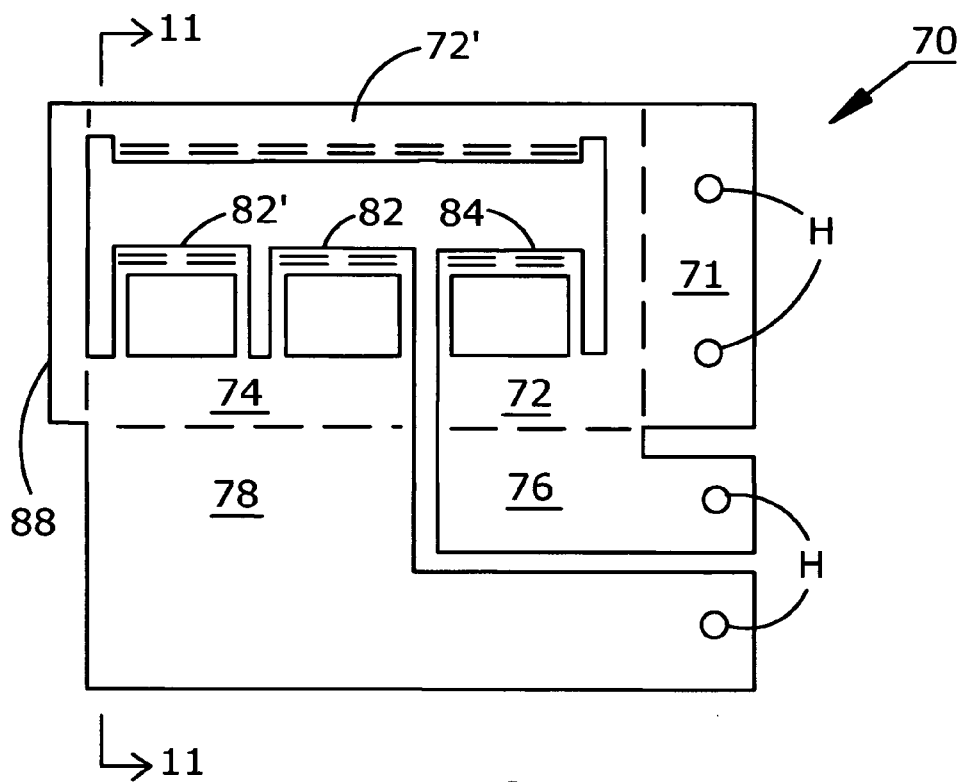
FIG. 10 is a top plan view of the bracket of FIG. 9 as punched from a planar sheet prior to being folded.

Referring now to FIG. 10, a top plan view of cable positioning bracket 70 of FIG. 9 is shown as it is punched from sheet metal prior to bending. The dashed lines in bracket 70 indicate folding locations to form the sheet into the three dimensional shape of FIG. 9. The flat shape is converted by folding anchor plate 71 and hinge plate 88 up while folding side plate 76 and side plate 78 down.

Figure 11:
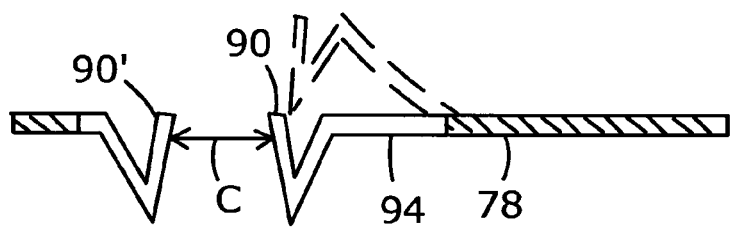
FIG. 11 is an enlarged cross sectional view taken along line 11-11 of FIG. 10 with a tab shown in dashed lines illustrating the bend condition.

Referring now to FIG. 11, inverted ridges 90 and 90' are shown in enlarged view taken along line 11-11 of FIG. 10. Ridge 90' is separated from ridge 90 by a distance C that is equal to or slightly smaller than the width of a cable to be inserted therebetween. The opposed edges of ridges 90, 90' are angled toward each other when at rest. When tab 94 is lifted by the insertion of a cable to the position illustrated in dashed lines, tab 94 follows a curve and the outer side of ridge 90 approaches parallel with the cable center line. In this way, scratching or abrasion of the cable is minimized. In addition, the curved bend optimizes the useful life of tab 94 by distributing the strain and deferring fatigue.

For reasons of manufacturing efficiency and packaging, the preferred material is the galvanized sheet metal noted above, however alternate gauges and material types are clearly possible. One alternate material available is injection molded plastic resin, e.g. polypropylene or high impact polystyrene resin.

While the description above discloses preferred embodiments of the present invention, it is contemplated that numerous variations of the invention are possible and are considered to be within the scope of the claims that follow.

What is claimed is:
1. A bracket for positioning a cable at a selected distance from a wall surface to be affixed to a building component, the bracket comprising:
　a. an anchor plate configured for attachment to the building component;
　b. a main platform extending outwardly from the anchor plate;
　c. a rear portion of the main platform extending outwardly from the anchor plate;
　d. a controllably bendable hinge plate connected at a first end thereof with the rear portion platform;
　e. a secondary platform connected at a second end of the hinge plate;
　f. a first tab connected to the main platform and oriented in a first direction, the first tab being formed with a window totally enclosed by a strip on each side thereof;
　g. wherein the secondary platform is configured for being pivoted relative to the building component and for being removably attached to the building component as the hinge plate is being bent; and
　h. wherein when a cable is positioned between the main platform and the rear portion of the main platform on a first side and the secondary platform on a second side, the cable is held at a selected distance from a wall surface to be mounted to the building component.

2. The cable positioning bracket described in claim 1, wherein the anchor plate is attached in parallel relation to a broad surface of the building component.

3. The cable positioning bracket described in claim 1, wherein the main platform, the rear portion of the main platform and the secondary platform reside in a plane substantially perpendicular to the anchor plate.

4. The cable positioning bracket described in claim 3, further comprising a first side plate depending from the main platform in perpendicular relation thereto.

5. The cable positioning bracket described in claim 4, further comprising a second side plate depending from the secondary platform in perpendicular relation thereto.

6. The cable positioning bracket described in claim 1, further comprising a second tab connected to the secondary platform and oriented in the first direction, the second tab being formed with a window totally enclosed by a strip on each side thereof.

\* \* \* \* \*